(12) United States Patent
Tseng et al.

(10) Patent No.: US 11,620,966 B2
(45) Date of Patent: Apr. 4, 2023

(54) MULTIMEDIA SYSTEM, DRIVING METHOD THEREOF, AND NON-TRANSITORY COMPUTER-READABLE STORAGE MEDIUM

(71) Applicant: HTC Corporation, Taoyuan (TW)

(72) Inventors: Jian-Zhi Tseng, Taoyuan (TW);
Wan-Hsieh Liu, Taoyuan (TW);
Yun-Ting Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 35 days.

(21) Appl. No.: 17/121,778

(22) Filed: Dec. 15, 2020

(65) Prior Publication Data

US 2022/0068244 A1   Mar. 3, 2022

Related U.S. Application Data

(60) Provisional application No. 63/070,279, filed on Aug. 26, 2020.

(51) Int. Cl.
| | |
|---|---|
| *G09G 5/37* | (2006.01) |
| *G09G 5/02* | (2006.01) |
| *H04N 7/01* | (2006.01) |
| *H04N 5/247* | (2006.01) |
| *G02B 7/12* | (2021.01) |

(52) U.S. Cl.
CPC ............... *G09G 5/37* (2013.01); *G02B 7/12* (2013.01); *G09G 5/02* (2013.01); *H04N 5/247* (2013.01); *H04N 7/0117* (2013.01); *H04N 7/0127* (2013.01); *G09G 2320/0666* (2013.01); *G09G 2320/08* (2013.01)

(58) Field of Classification Search
CPC .... G09G 5/37; G09G 5/02; G09G 2320/0666; G09G 2320/08; G02B 7/12; H04N 5/247; H04N 7/0177; H04N 7/0127; H04N 13/332; H04N 13/344; G06F 3/017; G06F 2200/1636
See application file for complete search history.

(56) References Cited

U.S. PATENT DOCUMENTS

| | | | | |
|---|---|---|---|---|
| 9,837,052 | B2 * | 12/2017 | Deering | ............ G02B 27/0093 |
| 2013/0050425 | A1 * | 2/2013 | Im | ......................... G06F 3/0304 |
| | | | | 348/46 |
| 2017/0344107 | A1 | 11/2017 | Aghara et al. | |
| 2017/0358138 | A1 | 12/2017 | Dack et al. | |
| 2020/0020138 | A1 | 1/2020 | Smith et al. | |
| 2020/0051320 | A1 | 2/2020 | Laffont et al. | |

FOREIGN PATENT DOCUMENTS

| | | | | |
|---|---|---|---|---|
| CN | 101872244 | * | 10/2010 | ............... G06F 3/01 |

OTHER PUBLICATIONS

Corresponding Taiwan office action dated Jan. 10, 2022.

* cited by examiner

*Primary Examiner* — Antonio A Caschera
(74) *Attorney, Agent, or Firm* — CKC & Partners Co., LLC

(57) ABSTRACT

A driving method, suitable for a multimedia system including a head-mounted device (HMD), includes the following operations: retrieving human factor data from a storage device, a radio signal, or an image; and according to the human factor data, automatically adjusting software for driving the HMD or hardware components of the multimedia system.

14 Claims, 7 Drawing Sheets

600

MULTIMEDIA SYSTEM, DRIVING METHOD THEREOF, AND NON-TRANSITORY COMPUTER-READABLE STORAGE MEDIUM

RELATED APPLICATION

This application claims priority to U.S. Provisional Application Ser. No. 63/070,279, filed Aug. 26, 2020, which is herein incorporated by reference in its entirety.

BACKGROUND

Technical Field

The present disclosure generally relates to a multimedia system, a related driving method, and a related non-transitory computer-readable storage medium. More particularly, the present disclosure relates to a multimedia system including a head-mounted device (HMD), a related driving method, and a related non-transitory computer-readable storage medium.

Description of Related Art

Virtual reality (VR) is a technology of using a computer to simulate a completely immersion three dimensional virtual world. Augmented reality (AR), on the other hand, does not give a complete immersion. AR adds digital elements to a live view captured by cameras. Mixed reality (MR) merges elements of both AR and VR, so that virtual objects co-exist and interact with real objects. In recent days, these computer technologies are applied to arcade consoles that serve arbitrary players, in which the players can have immersion game experience through wearing a head-mounted device (HMD).

SUMMARY

This disclosure provides a driving method suitable for a multimedia system including a head-mounted device (HMD). The driving method includes the following operations: retrieving human factor data from a storage device, a radio signal, or an image; and according to the human factor data, automatically adjusting software for driving the HMD or hardware components of the multimedia system This disclosure provides a multimedia system, which includes a HMD, a camera system, and a computing device. The HMD includes a display system. The camera system is disposed on or separated from the HMD. The computing device is communicatively coupled with the HMD and the camera system, and being configured to: retrieve human factor data from a storage device, a radio signal, or an image; and according to the human factor data, automatically adjust software for driving the HMD or hardware components of the multimedia system.

This disclosure provides a non-transitory computer-readable storage medium storing a computer program for controlling a multimedia system. The multimedia system includes a camera system, a computing device, and a HMD including a display system. The camera system is disposed on or separated from the HMD. The computing device is communicatively coupled with the HMD and the camera system. The computer program, when being executed by the computing device, causing the computing device to perform the following operations: retrieving human factor data from a storage device, a radio signal, or an image; and according to the human factor data, automatically adjusting software for driving the HMD or hardware components of the multimedia system.

It is to be understood that both the foregoing general description and the following detailed description are by examples, and are intended to provide further explanation of the disclosure as claimed.

DETAILED DESCRIPTION

Figure 1:
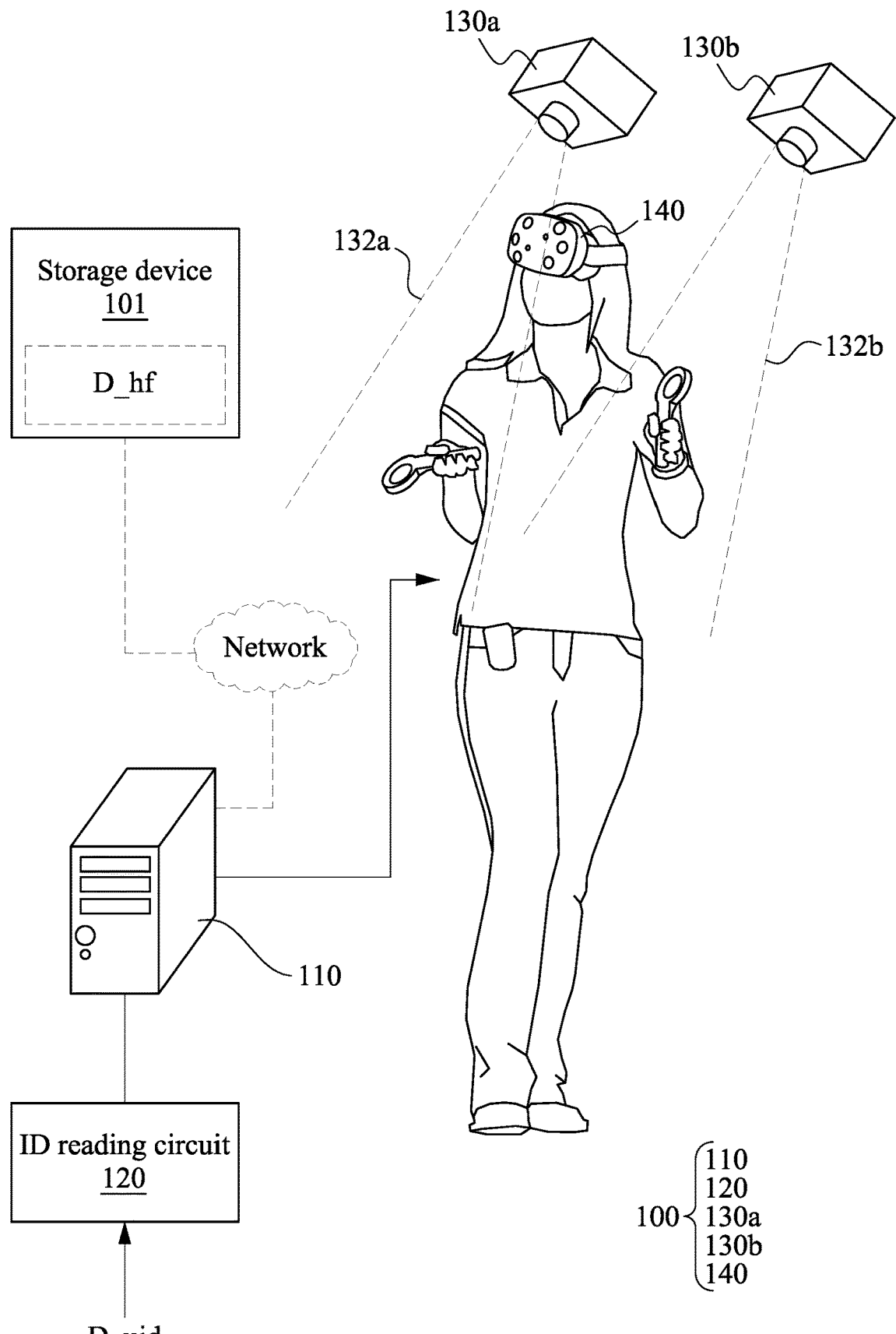
FIG. 1 is a schematic diagram of a multimedia system according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a schematic diagram of a multimedia system 100 according to one embodiment of the present disclosure. The multimedia system 100 comprises a computing device 110, an identifier (ID) reading circuit 120, a camera system including multiple cameras (e.g., cameras 130*a* and 130*b*), and a head-mounted device (HMD) 140. The computing device 110 is communicatively coupled with the ID reading circuit 120, the HMD 140, and the camera system, for example, through cables, Bluetooth, Wi-Fi direct, or other suitable wire or wireless connection. The computing device 110 is further communicatively coupled with a storage device 101 through network, in which the storage device 101 is configured to store human factor data D_hf of users of the multimedia system 100. The computing device 110 stores a computer program, and the computer program, when being executed by the computing device 110, causing the computing device 110 to adjust software for driving the HMD 140 or to adjust hardware components of the multimedia system 100 according to the human factor data D_hf.

Figure 3:
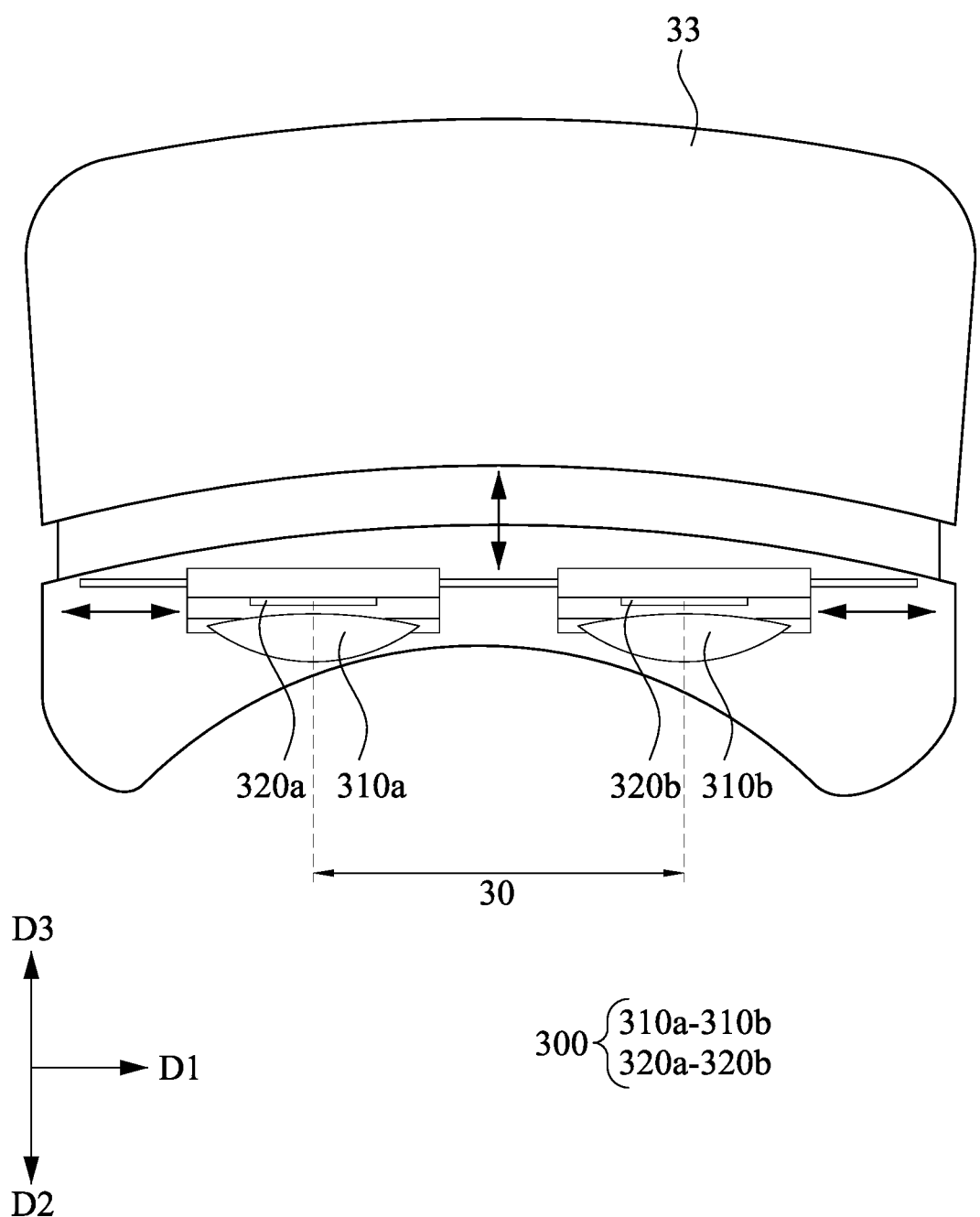
FIG. 3 is a schematic diagram of the HMD according to one embodiment of the present disclosure.

In some embodiments, the computing device 110 may be implemented by a personal computer, a game console, an arcade, a process circuit integrated with the HMD 140 or other suitable programmable electronic devices. In other embodiments, the ID reading circuit 120 may be implemented by a card reader, a storage reader, an optical sensor such as a camera for capturing bar codes or quick response (QR) codes, or a wireless/radio sensor such as radio frequency identification (RFID) circuits. Notably, the ID reading circuit 120 may be integrated with the computing device 110 or with the HMD 140 as a single device. For example, when the ID reading circuit 120 is implemented by the camera, the ID reading circuit 120 may be disposed on an outer surface of a frame 33 (as shown in FIG. 3) of the HMD 140.

Figure 2:
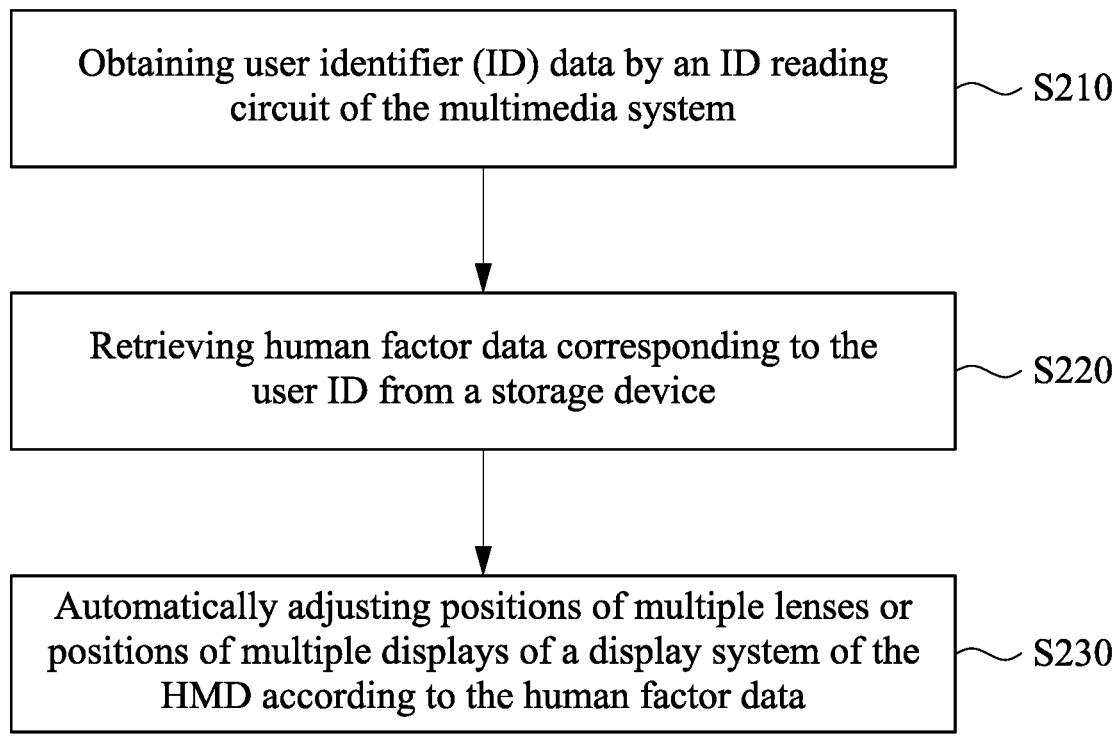
FIG. 2 is a driving method suitable for the multimedia system according to one embodiment of the present disclosure.

FIG. 2 is a driving method 200 suitable for the multimedia system 100 according to one embodiment of the present disclosure. The computinq device 110 may perform the driving method 200 when executing the program stored therein. In operation S210, the computing device 110 obtains user ID data D_uid through the ID reading circuit 120. In some embodiments, the user ID data D_uid may be stored in a chip card.

In other embodiments, users of the multimedia system 100 may register through a website to get a corresponding bar code or QR code recording the user ID data D_uid. For example, a user may register through the website by his/her mobile device (e.g., a smartphone), and fills his/her human factor data D_hf in a form provided by the website. A server (not shown) stores the human factor data D_hf transmitted by the mobile device in a memory space of the storage device 101, and the server then transmits the user ID data D_uid specifying the memory space to the mobile device to form the bar code or the QR code.

In operation S220, the computing device 110 retrieves, from the storage device 101, the human factor data D_hf corresponding to the user ID data D_uid obtained in operation S210. In this embodiment, the human factor data D_hf comprises an interpupillary distance (IPD) value and/or a diopter value. The human factor data D_hf is used in operation S230, in which the computing device 110 automatically adjusts positions of multiple displays or positions of multiple lenses of a display system 300 of the HMD 140 according to the human factor data D_hf.

FIG. 3 is a schematic diagram of the HMD 140 according to one embodiment of the present disclosure. The display system 300 of the HMD 140 comprises lenses 310a-310b arranged in line in a direction D1, and also comprises displays 320a-320b arranged in line in the direction D1. The displays 320a-320b are disposed behind the lenses 310a-310b, respectively. In specific, the lens 310a and the display 320a are disposed at two opposite sides of a housing, so that the lens 310a and the display 320a can be moved together. The lens 310b and the display 320b are disposed at two opposite sides of other housing to be moved together.

In operation S230 of some embodiments, the computing device 110 automatically adjusts a distance 30 between the displays 320a-320b to be corresponding to the IPD value, in which the displays 320a-320b and the lenses 310a-310b are moved in parallel with the direction D1, and the distance 30 is positively correlated to the IPD value.

In operation S230 of other embodiments, the computing device 110 automatically moves the displays 320a-320b with the lenses 310a-310b along a direction D2 or D3 according to the diopter value, in which the directions D2 and D3 are opposite to each other and both substantially perpendicular to the direction D1. Specifically, in response to the diopter value is negative, (i.e., the user corresponding to the user ID data D_uid is nearsighted), the computing device 110 moves the displays 320a-320b and the lenses 310a-310b along the direction D2. On the other hand, in response to the diopter value is positive (i.e., the user corresponding to the user ID data D_uid is foresighted) the computing device 110 moves the displays 320a-320b and the lenses 310a-310b along the direction D3.

In this way, the driving method 200 helps to reduce distortions of pictures or distortions of a virtual environment saw by the user. The foregoing embodiments may be combined so that the computing device 110 adjusts the lenses 310a-310b and the displays 320a-320b according to the IPD value and/or the diopter value. In some embodiments, the displays 320a-320b may be moved independently of the lenses 310a-310b, that is, when the computing device 110 moves the displays 320a-320b in operation S230, the lenses 310a-310b need not to be moved together. Similarly, when the computing device 110 moves the lenses 310a-310b in operation S230, the displays 320a-320b need not to be moved together.

Figure 4:
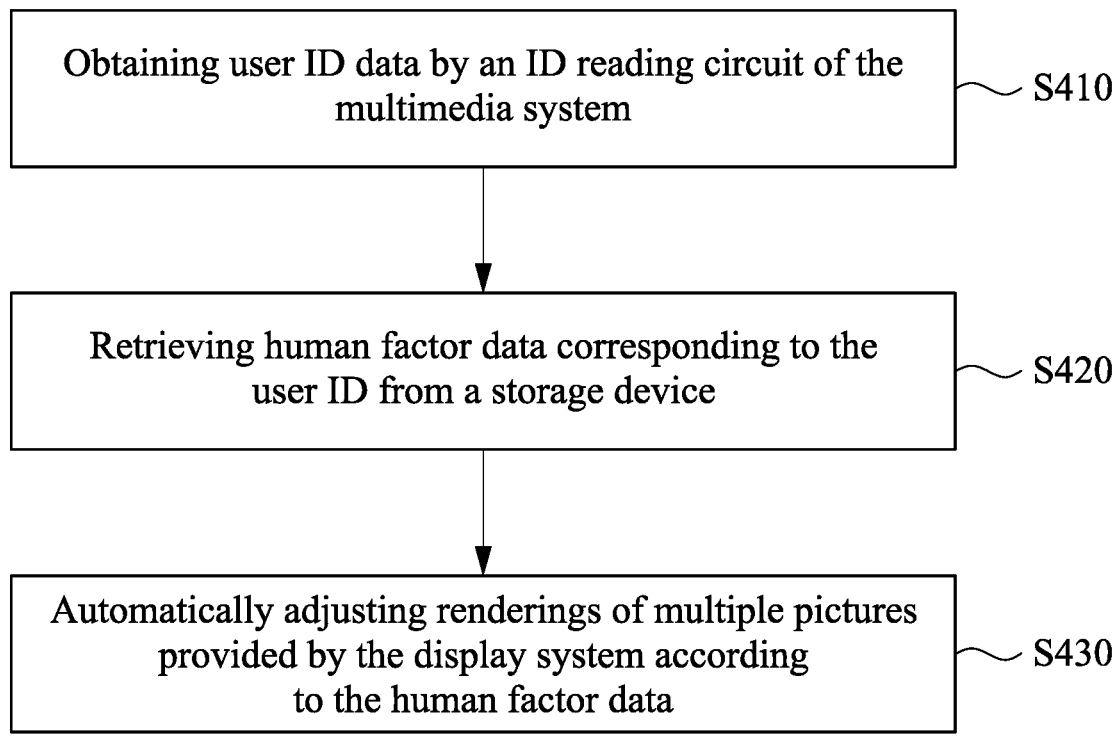
FIG. 4 is a driving method suitable for the multimedia system according to one embodiment of the present disclosure.

FIG. 4 is a driving method 400 suitable for the multimedia system 100 according to one embodiment of the present disclosure. The computinq device 110 may perform the driving method 400 when executing the program stored therein. Operations S410-S420 is similar to operations S210-S220. For the sake of brevity, those descriptions will not be repeated here.

In this embodiment, the human factor data D_hf comprises a degree parameter and a type parameter of color blindness, and/or comprises a height value. The type parameter represents the type of color blindness of the user corresponding to the user ID data D_uid, such as normal vision, red-green color blind or blue-yellow color blind. The degree parameter represents different levels of color blindness of the user corresponding to the user ID data D_uid, such as slight level, medium level and serious level. The height value represents a height of the user corresponding to the user ID data D_uid. In operation S430, the computing device 110 automatically adjusts renderings of frames provided to the display system 300 according to the human factor data D_hf.

In operation S430 of some embodiments, the computing device 110 drives the HMD 140 in a colorblind mode, so that to adjust colors of the frames provided to the display system 300 according to the degree parameter and the type parameter.

Figure 5:
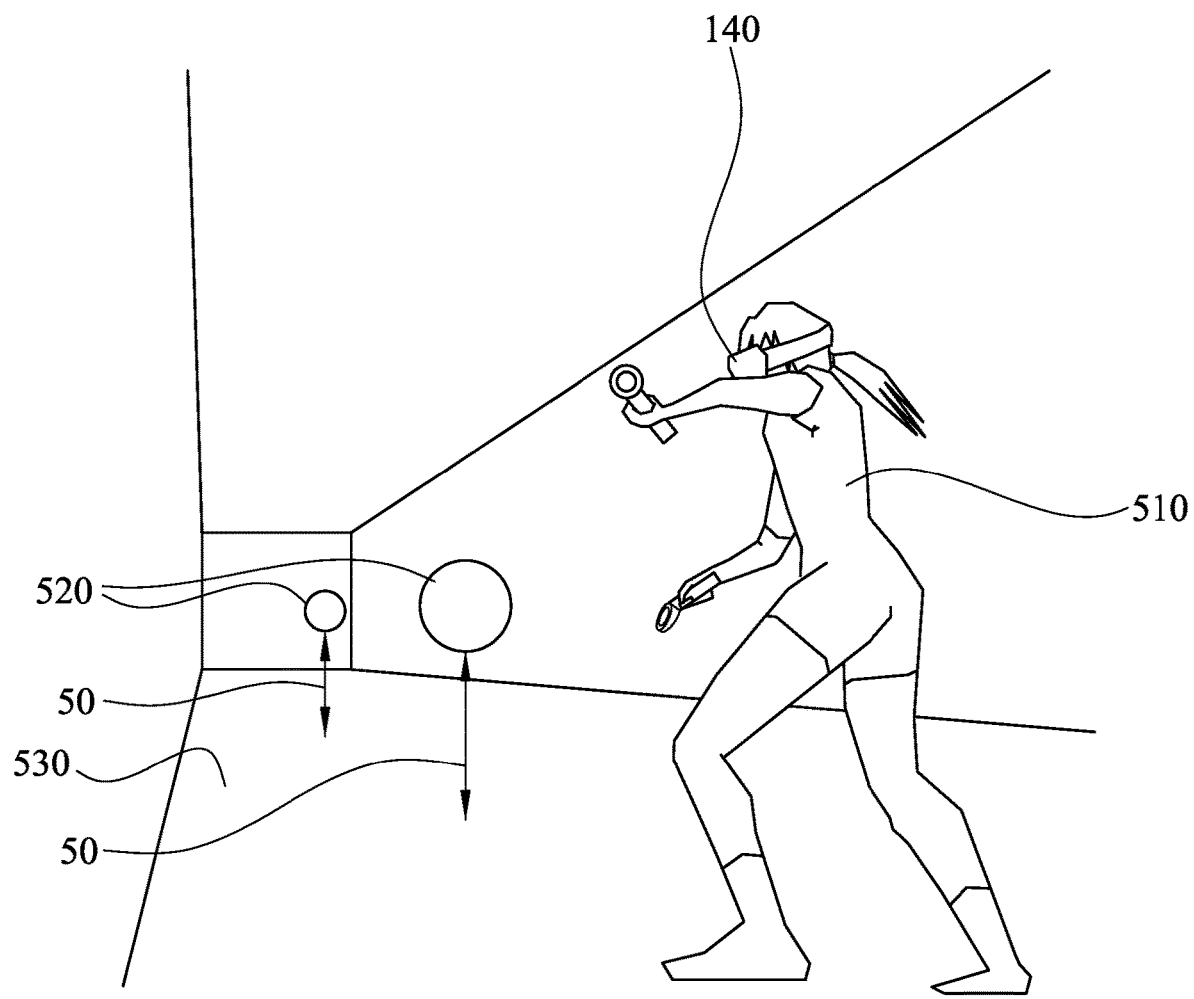
FIG. 5 is a schematic diagram of a virtual environment provided by the HMD.

FIG. 5 is a schematic diagram of a virtual environment provided by the HMD 140. For explanation convenience, the user 510 of the HMD 140 is depicted in FIG. 5 though the user 510 may not be displayed in the virtual environment. The virtual environment comprises multiple virtual objects 520 and a virtual plane 530 where the user 510 locates or stands. Each virtual object 520 is separated from the virtual plane 530 by a distance 50. In some embodiments, the virtual plane 530 is generated according to information, captured by the camera system, of a ground plane of a physical environment where the user 510 locates or stands.

In operation S430 of some embodiments, the computing device 110 automatically adjusts the distance 50 according to the height value. For example, the distance 50 is adjusted to be positively correlated to the height value. As a result, the user 510 can interact with the virtual objects 520 comfortably.

Figure 6:
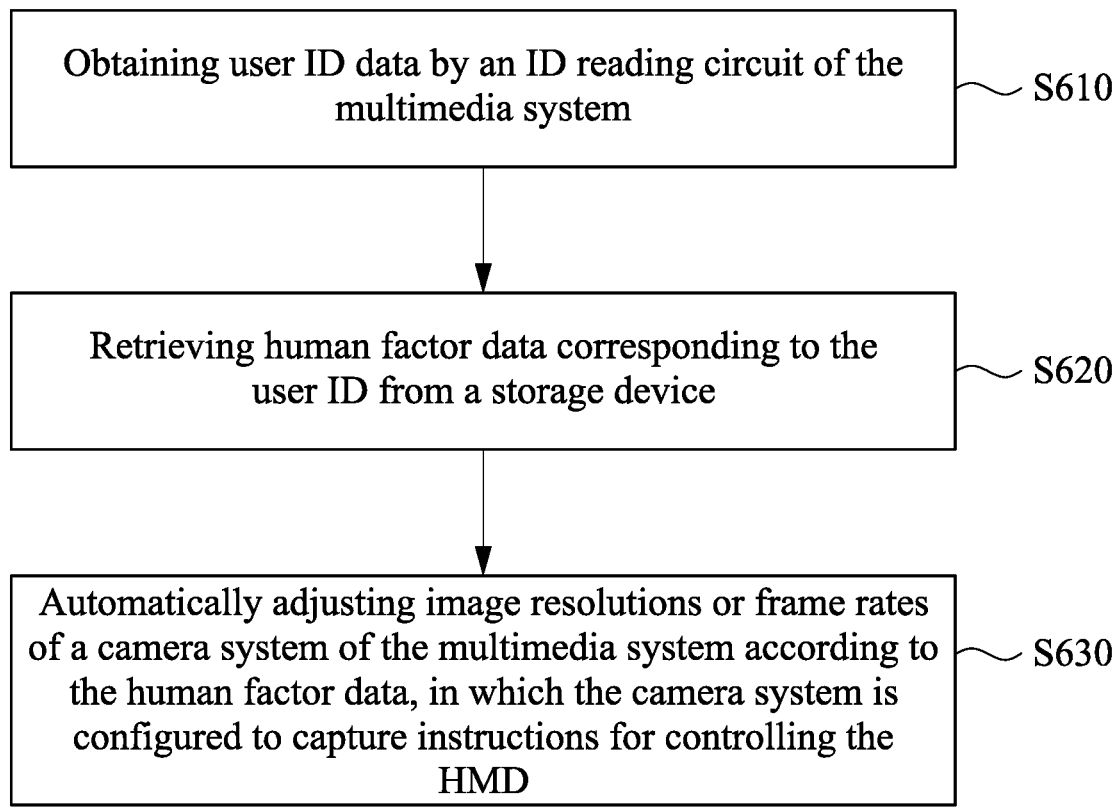
FIG. 6 is a driving method suitable for the multimedia system according to one embodiment of the present disclosure.

FIG. 6 is a driving method 600 suitable for the multimedia system 100 according to one embodiment of the present disclosure. The computing device 110 may perform the driving method 600 when executing the program stored therein. Operations S610-S620 is similar to operations S210-S220. For the sake of brevity, those descriptions will not be repeated here.

Reference is made to FIG. 1 and FIG. 6. In operation S630, the computing device 110 automatically adjusts image resolutions or frame rates of the camera system (e.g., the cameras 130a and 130b) according to the human factor data D_hf. In this embodiment, the camera system is configured to capture information for controlling contents displayed by the HMD 140. For example, the captured information includes gestures or positions of hands of the user, or positions of hand-held controllers. The cameras 130a and 130b have respective fields of view, which are herein referred as "sense regions" 132a-132b depicted with dotted lines in FIG. 6.

The user may place his/her hands or the hand-held controllers in one of the sense regions 132a-132b more frequently than in another of the sense regions 132a-132b, one of the reasons that causes this phenomenon is that the user may be right-handed or left-handed, another reason is that the virtual content may encourage the user to act in one of the sense regions 132a-132b. Therefore, in this embodiment, the human factor data D_hf includes habit information of the user corresponding to the user ID data D_uid. The habit information includes probabilities of the user to place his/her hands or the hand-held controllers in each of the sense regions 132a-132b. If the computing device 110 determines, according to the habit information, that one of the sense regions 132a-132b corresponding to a higher probability than another, the computing device 110 sets the one of the cameras 130a-130b corresponding to the higher probability to have a higher frame rate or a higher image resolution than another. In some embodiments, if the computing device 110 determines, according to the habit information, that one of the sense regions 132a-132b corresponding to a lower probability than another, the computing device 110 sets the one of the cameras 130a-130b corresponding to the lower probability to have a lower frame rate or a lower image resolution than another.

For example, the user may have a higher probability of placing his/her hands or the hand-held controllers in the sense region 132a, and thus the sense region 132b is corresponding to a lower probability, rendering the computing device 110 to set a frame rate or an image resolution of the camera 130a to be higher than that of the camera 130b, or to set a frame rate or an image resolution of the camera 130b to be lower than that of the camera 130a. Since the driving method 600 may adaptively reduce the frame rate or the image resolution of one or more cameras of the camera system, the driving method 600 is help to reduce power consumption of the multimedia system 100.

In some embodiments, the driving method 600 is also suitable for multiple cameras on the HMD 140, in which these cameras may be disposed on the outer surface of the frame 33 of the HMD 140 and be configured to capture information for controlling contents displayed by the HMD 140.

Figure 7:
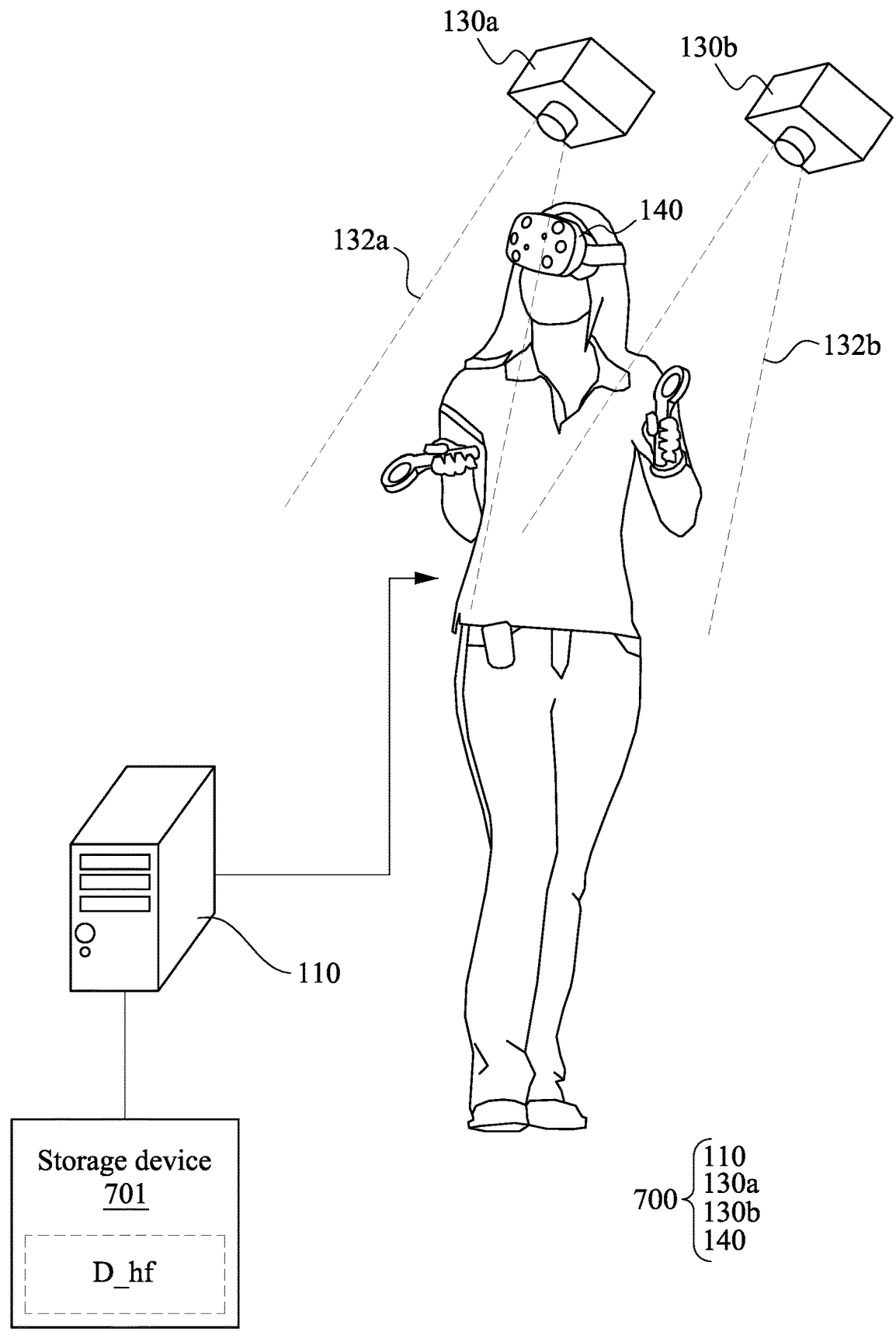
FIG. 7 is a schematic diagram of a multimedia system according to one embodiment of the present disclosure.

FIG. 7 is a schematic diagram of a multimedia system 700 according to one embodiment of the present disclosure. The multimedia system 700 comprises the computing device 110, the camera system (e.g., the cameras 130a-130b), and the HMD 140. The computing device 110 is configured to be coupled with a storage device 701, and configured to retrieve the human factor data D_hf from the storage device 701. In some embodiments, the storage device 701 may be implemented by a dongle or a flash disk.

The multimedia system 700 is suitable for performing the modified driving methods 200, 400, and 600, in which operations S210-S220, operations S410-S420, and operations S610-620 are respectively replaced by the following operation: retrieving the human factor data D_hf from the storage device 701. By assuming the owner of the storage device 701 is the user going to use the multimedia system 700, there is no need to retrieve the user ID data D_uid in this embodiment, thereby the multimedia system 700 having a simplified circuitry. The foregoing descriptions regarding to other corresponding implementations, connections, operations, and related advantages of the multimedia system 100 are also applicable to the multimedia system 700. For the sake of brevity, those descriptions will not be repeated here.

In some embodiments, the modified driving methods 200, 400, and 600 are formed by replacing operations S210-S220, operations S410-S420, and operations S610-620 respectively by the following operation: retrieving the human factor data D_hf from a radio signal generated by a RFID circuit or a near-filed communication (NFC) circuit.

In yet some embodiments, the modified driving methods 200, 400, and 600 are formed by replacing operations S210-S220, operations S410-S420, and operations S610-620 respectively by the following operation: retrieving the human factor data D_hf from an image, in which the image is a bar code or a quick response code.

Notably, the driving methods 200, 400, and 600 (or the modified driving methods 200, 400, and 600) may be performed in parallel or in sequence. Moreover, since operations S210-S220 are similar to operations S410-S420 and S610-620, one or more of operations S230, S430 and S630 may be performed after any one of operations S220, S420 and 620.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the present disclosure will be apparent to those skilled in the art from consideration of the specification and practice of the present disclosure disclosed herein. It is intended that the specification and examples be considered as exemplary only, with a true scope and spirit of the present disclosure being indicated by the following claims.

What is claimed is:

1. A driving method suitable for a multimedia system comprising a head-mounted device (HMD), comprising:
  directly retrieving human factor data from a radio signal or a QR code; and
  according to the human factor data, automatically adjusting software for driving the HMD or hardware components of the multimedia system, comprising:
    adjusting image resolutions or frame rates of a camera system of the multimedia system according to the human factor data, wherein the camera system is disposed on or separated from the HMD,
  wherein the human factor data comprises habit information of a user, the camera system comprises a first camera and a second camera, and adjusting the image resolutions or the frame rates of the camera system according to the human factor data comprises:

if a computing device of the multimedia system determines, according to the habit information, that the user has a higher probability of placing a hand or a controller in a first sense region of the first camera than in a second sense region of the second camera, setting a frame rate or an image resolution of the first camera to be higher than a frame rate or an image resolution of the second camera.

2. The driving method of claim 1, wherein automatically adjusting the software for driving the HMD or the hardware components of the multimedia system further comprises:
   adjusting positions of a plurality of lenses or positions of a plurality of displays of a display system of the HMD according to the human factor data.

3. The driving method of claim 2, wherein the human factor data further comprises an interpupillary distance (IPD) value, and adjusting the positions of the plurality of lenses or the positions of the plurality of displays of the display system of the HMD according to the human factor data comprises:
   adjusting a first distance between a first display and a second display of the plurality of displays or a second distance between a first lens and a second lens of the plurality of lenses according to the IPD value, wherein the first distance and the second distance are positively correlated to the IPD value.

4. The driving method of claim 2, wherein the human factor data further comprises a diopter value, the plurality of displays comprise a first display and a second display arranged in line in a first direction, and the plurality of lenses comprise a first lens and a second lens arranged in line in the first direction, wherein adjusting the positions of the plurality of lenses or the positions of the plurality of displays of the display system of the HMD according to the human factor data comprises:
   moving the first display together with the second display or the first lens together with the second lens along a second direction perpendicular to the first direction according to the diopter value.

5. The driving method of claim 1, wherein automatically adjusting the software for driving the HMD or the hardware components of the multimedia system further comprises:
   adjusting renderings of a plurality of frames provided to a display system of the HMD according to the human factor data.

6. The driving method of claim 5, wherein the human factor data further comprises a degree parameter and a type parameter of color blindness, and adjusting the renderings of the plurality of frames provided to the display system of the HMD according to the human factor data comprises:
   adjusting colors of the plurality of frames on the basis of the degree parameter or the type parameter.

7. The driving method of claim 5, wherein the human factor data further comprises a height value of a user, and adjusting the renderings of the plurality of frames provided to the display system of the HMD according to the human factor data comprises:
   adjusting, according to the height value, a distance between a virtual object and a virtual plane at which the user locates, wherein the distance is positively correlated to the height value.

8. A multimedia system, comprising:
   a head-mounted device (HMD), comprising a display system;
   a camera system disposed on or separated from the HMD; and
   a computing device, communicatively coupled with the HMD and the camera system, and being configured to:
      directly retrieve human factor data from a radio signal or a QR code; and
      according to the human factor data, automatically adjust software for driving the HMD or hardware components of the multimedia system, comprising:
         adjusting image resolutions or frame rates of the camera system according to the human factor data,
      wherein the human factor data comprises habit information of a user, the camera system comprises a first camera and a second camera, and the computing device being configured to adjust the image resolutions or the frame rates of the camera system according to the human factor data by being configured to:
         if the computing device determines, according to the habit information, that the user has a higher probability of placing a hand or a controller in a first sense region of the first camera than in a second sense region of the second camera, set a frame rate or an image resolution of the first camera to be higher than a frame rate or an image resolution of the second camera.

9. The multimedia system of claim 8, wherein the computing device further being configured to automatically adjust the software for driving the HMD or the hardware components of the multimedia system by being configured to adjust positions of a plurality of lenses or positions of a plurality of displays of the display system according to the human factor data, wherein the human factor data further comprises an interpupillary distance (IPD) value, and the computing device being configured to adjust the positions of the plurality of lenses or the positions of the plurality of displays of the display system according to the human factor data by being configure to:
   adjust a first distance between a first display and a second display of the plurality of displays or a second distance between a first lens and a second lens of the plurality of lenses according to the IPD value, wherein the first distance and the second distance are positively correlated to the IPD value.

10. The multimedia system of claim 8, wherein the computing device further being configured to automatically adjust the software for driving the HMD or the hardware components of the multimedia system by being configured to adjust positions of a plurality of lenses or positions of a plurality of displays of the display system according to the human factor data, wherein the human factor data further comprises a diopter value, the plurality of displays comprise a first display and a second display arranged in line in a first direction, and the plurality of lenses comprise a first lens and a second lens arranged in line in the first direction, wherein the computing device being configured to adjust the positions of the plurality of lenses or the positions of the plurality of displays of the display system according to the human factor data by being configure to:
   moving the first display together with the second display or the first lens together with the second lens along a second direction perpendicular to the first direction according to the diopter value.

11. The multimedia system of claim 8, wherein the computing device further being configured to automatically adjust the software for driving the HMD or the hardware components of the multimedia system by being configured to:

adjust renderings of a plurality of frames provided to the display system of the HMD according to the human factor data.

12. The multimedia system of claim 11, wherein the human factor data further comprises a degree parameter and a type parameter of color blindness, and the computing device being configured to perform adjusting the renderings of the plurality of frames provided to the display system of the HMD according to the human factor data by being configured to:

adjust colors of the plurality of frames on the basis of the degree parameter and the type parameter.

13. The multimedia system of claim 11, wherein the human factor data further comprises a height value of a user, and the computing device being configured to adjust the renderings of the plurality of frames provided to the display system of the HMD according to the human factor data by being configured to:

adjust, according to the height value, a distance between a virtual object and a virtual plane at which the user locates, wherein the distance is positively correlated to the height value.

14. A non-transitory computer-readable storage medium storing a computer program for controlling a multimedia system comprising a camera system, a computing device, and a head-mounted device (HMD) comprising a display system, wherein the camera system is disposed on or separated from the HMD, the computing device is communicatively coupled with the HMD and the camera system, and the computer program, when being executed by the computing device, causing the computing device to perform:

directly retrieving human factor data from a radio signal or a QR code; and according to the human factor data, automatically adjusting software for driving the HMD or hardware components of the multimedia system, comprising:

adjusting image resolutions or frame rates of a camera system of the multimedia system according to the human factor data, wherein the camera system is disposed on or separated from the HMD, wherein the human factor data comprises habit information of a user, the camera system comprises a first camera and a second camera, and adjusting the image resolutions or the frame rates of the camera system according to the human factor data comprises:

if a computing device of the multimedia system determines, according to the habit information, that the user has a higher probability of placing a hand or a controller in a first sense region of the first camera than in a second sense region of the second camera, setting a frame rate or an image resolution of the first camera to be higher than a frame rate or an image resolution of the second camera.

* * * * *